Feb. 16, 1965 L. J. QUICK 3,169,549
MIXING VALVE
Filed Nov. 20, 1961 2 Sheets-Sheet 1
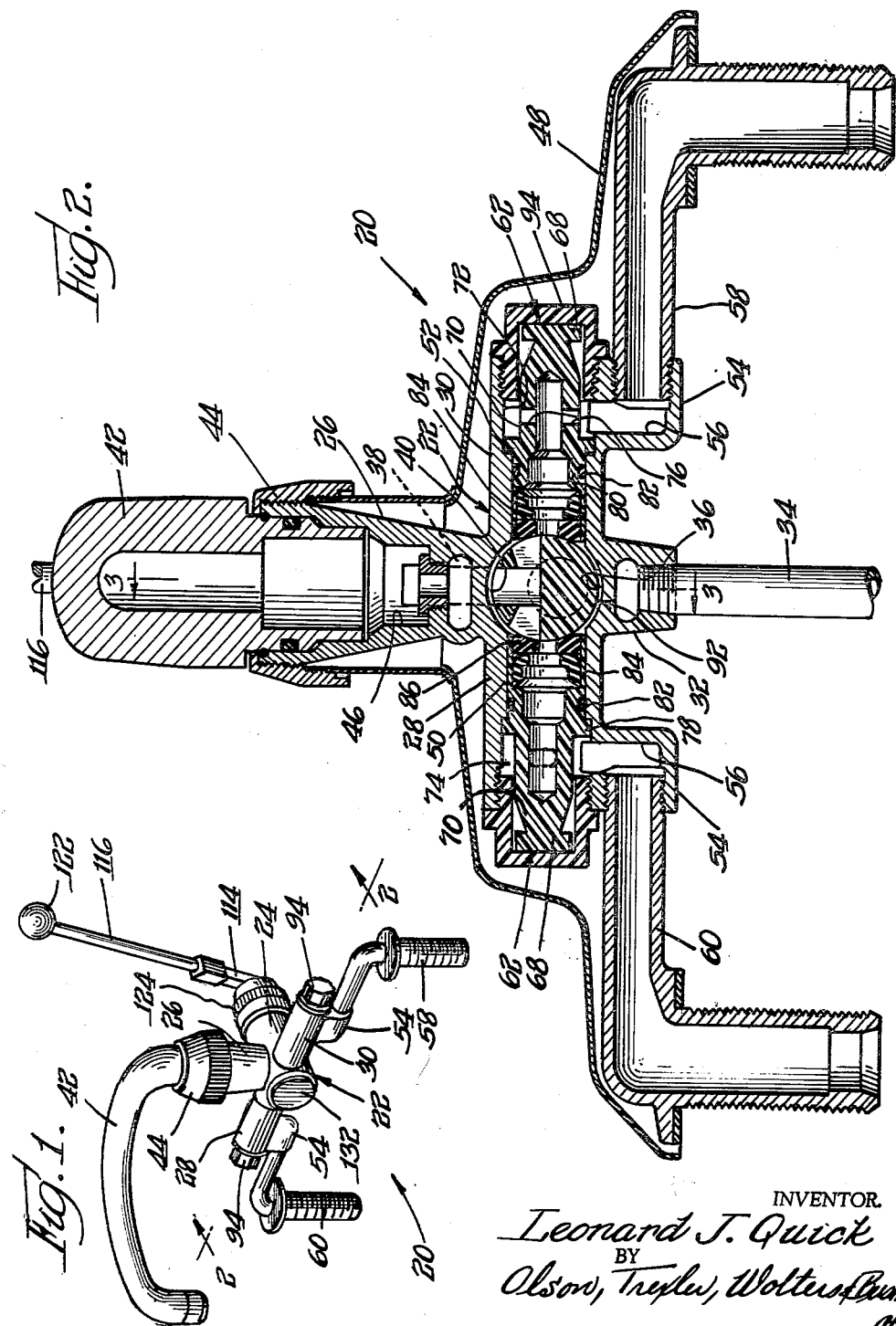
INVENTOR.
Leonard J. Quick
BY
Olson, Trexler, Wolters&...
attys.

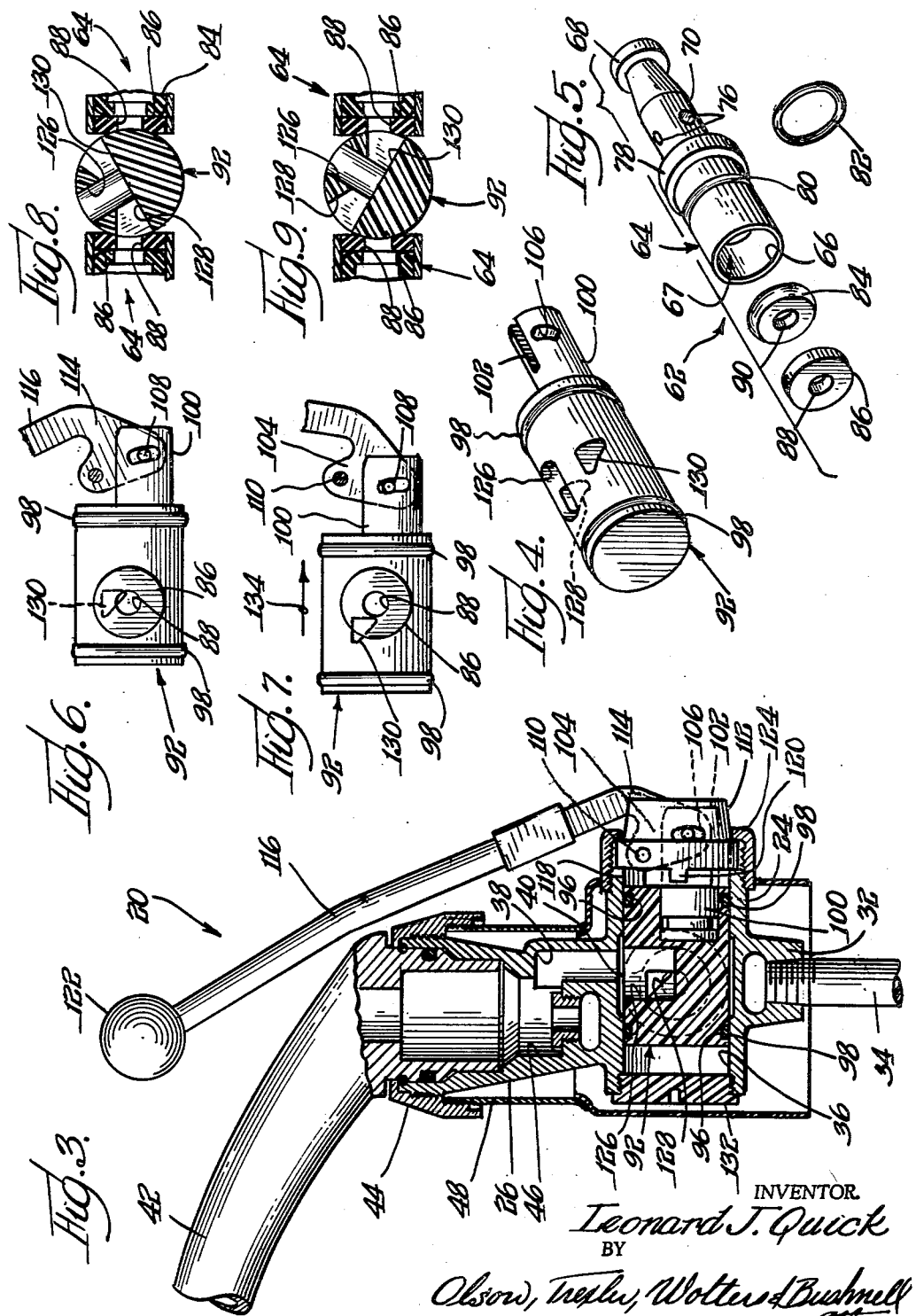

United States Patent Office 3,169,549
Patented Feb. 16, 1965

3,169,549
MIXING VALVE
Leonard J. Quick, Burlington, Wis., assignor to Burlington Brass Works Inc., Burlington, Wis., a corporation of Wisconsin
Filed Nov. 20, 1961, Ser. No. 153,529
6 Claims. (Cl. 137—625.17)

This invention relates generally to valve structures and especially to valve structures arranged to mix a plurality of fluids.

In one specific aspect, the present invention relates to a kitchen faucet valve for mixing hot and cold water through the operation of a single control lever.

Mixing valves for use in the home, particularly in the water lines at the kitchen sink, have been available in the past. However, the prior art valves of this type have commonly employed special constructions and unusual porting and valving arrangements. Accordingly, these prior art mixing valves have required special tools for disassembly and/or have required the trimming of metal seats for reestablishing leakproof operation. As a result, these prior art mixing valves have not been generally susceptible to rehabilitation by the average home repairman; and heretofore, the not infrequent practice has been to remove the entire valve assembly and to replace it with a new or reconditioned unit. It is, therefore, an important object of the present invention to provide an improved valve structure which is easy to disassemble and repair.

A more general object of the invention is to provide a new and improved valve structure.

A mixing valve of the type exemplified herein desirably minimizes alteration in the relative proportions of the mixed fluids during regulation of the aggregate flow. In the absence of such a feature, the desirability of the valve to the homeowner would be restricted, with a concomitant limitation in the use and market for the device. Hence, it is another object of the present invention to provide a mixing valve which achieves substantially independent regulation of both the aggregate flow and the fluid proportioning.

Additional objects and features of the invention pertain to the particular structure and arrangements whereby the above objects are attained.

A structure in accord with the invention includes a valve body; a cylindrical valve plug disposed in the valve body to be slidable along and rotatable about its own longitudinal axis, the valve plug having a chamber hollowed therein and a radial port opening into the chamber; a flexible, replaceable element having an orifice therethrough; and a removable thimble in the valve body carrying the replaceable element in its open end, the thimble being disposed radially of the valve plug cooperatively to situate the orifice relative to the radial port in the valve plug, the thimble being apertured to pass inlet fluid to the orifice.

In order that the principle of the invention may be readily understood, a single embodiment thereof applied to a kitchen faucet valve, but to which the application is not to be restricted, is shown in the accompanying drawings wherein:

FIG. 1 is a perspective view of a valve structure arranged in compliance with the invention shown with the shield removed to reveal details of the valve body;

FIG. 2 is an enlarged view taken through the section 2—2 of FIG. 1;

FIG. 3 is a view taken through the section 3—3 of FIG. 2;

FIG. 4 is a perspective view of the valve plug used in the valve arrangement of FIG. 1;

FIG. 5 is an exploded perspective view of the carrier unit used in the valve arrangement of FIG. 1;

FIG. 6 is a schematic view showing cooperation between the carrier unit and the valve plug in one position of relative reciprocation;

FIG. 7 is similar to the showing of FIG. 6 but illustrating the cooperation of the parts in a different position of relative reciprocation;

FIG. 8 schematically illustrates cooperation of the valve plug and the two adjacent carrier units in one position of relative rotation; and FIG. 9 is a cross-sectional view similar to the showing of FIG. 8 but illustrating a different position of relative rotation of the parts.

Referring now in detail to the drawings, specifically to FIGS. 1–3, a valve structure indicated generally by the numeral 20 will be seen to include a valve body 22 having a horizontally disposed central portion 24, an upstanding outlet portion 26 and horizontally opposed inlet portions 28 and 30 situated at right angles to the portion 24. The valve body 22 is desirably fashioned from a brass casting, a depending boss 32 thereof being suitably drilled and tapped threadedly to receive a support post 34 in the installation of the valve structure 20, as is shown in FIGS. 2 and 3.

The central portion 24 of the valve body is provided with a cylindrical bore 36; and an outlet passageway 38 communicates with bore 36 through a rectangular orifice 40 disposed at an upper surface portion of the bore. The outlet passageway 38 is contained in the upright portion 26 of the valve body; and the upright portion 26 is adapted to have a spout or faucet member 42 secured to its upper end by any suitable means, such as by a cap 44. Passageway 38 communicates with the passageway provided in the spout through a chamber 46 formed in the upright portion 26. In use, the valve body 22 is advantageously concealed beneath a protective and decorative shield 48 shown in FIGS. 2 and 3.

The inlet portions 28 and 30 are selected to take tubular form whereby to define generally cylindrical passageways, passageways 50 and 52 respectively. opening radially from the bore 36 as is well shown in FIG. 2. An enlargement 54 is joined radially to each of the portions 28 and 30; and the enlargements 54 define channels 56 therein opening radially from the passageways 50 and 52. The enlargements 54 are desirably threaded internally to receive the cooperatively threaded end portions of fittings 58 and 60 which connect the inlet portions 28 and 30 respectively to the cold and hot water supply lines conventionally available in household plumbing.

In accordance with the present invention, a removable carrier unit 62 is situated in the bore of each of the inlet portions 28 and 30 in order to control and direct fluid from the respective supply lines to the central cylindrical bore 36. Turning to FIG. 5, a carrier unit 62 will be seen to comprise a hollow rigid unit or thimble 64 having an open end or mouth 66 communicating with a blind central bore or hollow 67. Thimble 64 also has a closed end terminating in an enlargement 68 opposite to the open end. Each of the thimbles 64 further includes a portion 70 of reduced cross-section; and considering for the moment FIG. 2, the reduced sections 70 will be observed to cooperate with radially enlarged portions 72 of the hollow interior of the respective inlet passageways 50 and 52 in defining annular chambers 74 which are open to the channels 56 and thereby to the corresponding supply lines. In order to communicate the hollow 67 of thimble 64 with the corresponding supply line, the reduced section 70 is provided with a suitable number of radial ports 76.

Between the ports 76 and the mouth 66, a positioning flange 78 radiates from the thimble 64; and this flange cooperates with a shoulder formed in the bore of the corresponding inlet passageway for purposes of locating the thimble 78 therein. Intermediate the flange 78 and the mouth 66, a groove 80 is fashioned in the exterior surface of the thimble. This groove 80 receives an O-ring 82 which acts between the thimble and the interior walls of the corresponding inlet passageway to provide a fluid seal downstream from the ports 76 at the periphery of the thimble 64.

The present invention also contemplates provision of fluid sealing means acting against the interior surface of the central bore 67 of the thimble; and these means specifically include a rubber cup washer 84 which is inserted in the bore 67 with its open side facing upstream as is well indicated in FIG. 2. The cup washer 84 is particularly arranged to cooperate with a flexible element 86 having a central aperture or orifice 88 fashioned therein, cup washer 84 being cooperatively formed with an aperture or orifice 90 which registers with the orifice 88. It is important to point out at this juncture that the orifices 88 define the particular means through which fluid flows from the respective inlet passageways to the central bore 36. Moreover, each of the flexible elements 86 is adapted to cooperate with a cylindrical valve plug 92 slidably and rotatably situated in the bore 36 as will be described more fully hereinafter. Because of the co-action between the flexible elements 86 and the valve plug 92, the flexible elements define wear surfaces as well as fluid exit orifices. Therefore, and in order to facilitate repair of the valve structure of the invention, the flexible elements 86 are arranged to take the form of readily commercially available, rubber seat washers of conventional size and construction. The cup washer 84 acts to provide a fluid seal between the flexible element 86 and the interior walls of the bore 67.

The exterior ends of the inlet passageways 28 and 30 are advantageously threaded internally whereby to receive externally threaded, hollow caps 94, shown in FIGS. 1 and 2. The caps 94 encompass the enlargements 68 and position the thimbles 62 within the corresponding inlet passageway. Specifically, the inside end of the cap 94 is arranged to abut the confronting face of the corresponding enlargement 68 to urge the thimble 64 toward the valve plug 92 and the flange 78 of the thimble into arresting engagement with the corresponding shoulder formed in the bore of the inlet passageway. The flexibility of the elements 86 enables them to take a concave shape conforming to the surface of plug 92 when urged thereagainst, as by fluid pressure. Thus, the elements 86 are capable of fitting against the plug 92 in any position of rotation of the element.

As will be recognized, the above-described arrangement of the thimble and the end cap exposes the enlargement 68 upon unscrewing of the end cap; and because the enlargement 68 is arranged to possess a radial extent greater than the immediately adjacent portion of the thimble, the enlargement is readily grasped with the fingers for withdrawal for purposes of inspecting the fluid seal or the flexible element or for replacing any of these members if they have become worn to the point of permitting leakage. It is important to note that neither special tools nor resurfacing of a metal seat is thus required in rehabilitation of the valve structure of the invention.

With principal reference to FIG. 3 and secondary reference to FIG. 4, the valve plug 92 will be seen fashioned with peripheral grooves 96 situated adjacent opposite ends, O-rings 98 being situated in the grooves 96 to provide fluid seals acting between the valve plug and the wall of bore 36.

A stem 100 is rigidly connected to the valve plug 92; and this connection is advantageously achieved by fabricating the stem 100 from brass and by molding the valve plug 92 about the stem, valve plug 92 desirably taking the form of a water-resistant resinous plastic material, such as the resinous plastic material available commercially under the trademark "Lexan." The thimbles 64 are also desirably fabricated from such a material. The stem 100 is particularly fashioned with an axial slot 102 opening away from the valve plug 92; and a crank 104 is slidably inserted in the slot 102. The stem 100 is also fashioned with a transverse slot 106 intersecting the slot 102, a pin 108 passing through the slot 106 and the crank 104 to define a pivot for the crank. Since pin 108 is relocatable within the confines of slot 106 the pivot defined thereby is similarly relocatable.

The crank 104 also receives a pin 110 which is disposed parallel to pin 108 in spaced apart relationship therewith, pin 110 being received in a bore drilled in a retainer 112 which is also provided with a slot to pass a tongue 114 from the crank 104 to an operating lever 116. The slot in retainer 112 is aligned with the slot 102 fashioned in stem 100. The retainer 112 also includes a necked-down portion 118 which is adapted to enter the bore 36; and radial lugs 120 are raised from the necked-down portion 118 in diametric relationship to operate in grooves, not shown, fashioned in the mouth of the bore so as to limit the permissible angular movement of the valve plug 92 within the bore 36.

For purposes of convenience in manipulating the valve plug 92 by means of the lever 116, a manual control knob 122 is affixed to the free end of the lever. Furthermore, a cap 124 is arranged threadedly to engage the free end of portion 24 at an annular shoulder formed thereon so as to restrain the retainer 112 against axial movement, it being arranged so that retainer 112 is not restrained against rotative movement by means of the cap 124. Retainer 112 is advantageously fashioned from a resinous plastic material having good mechanical properties such as for example the polyformaldehyde resin commercially available under the trademark "Delrin."

In order to pass fluid from the orifices 88 to the orifice 40, the valve plug 92 is fashioned with a hollow or mixing chamber 126 and with triangular ports 128 and 130 opening radially from the hollow 126. As is well shown in FIG. 3, the hollow 126 is generally aligned beneath orifice 40 and is arranged to take an axial extent sufficient to insure at least partial registration with the orifice 40 upon axial shifting of the valve plug 92. Moreover, the radial ports 128 and 130 are generally oppositely situated within an approximately 180° arc of the valve plug in order to cooperate with the flexible elements 86 which are disposed in the inlet passages 28 and 30 by means of the thimbles 64. The end of bore 36 which is opposite to the end receiving retainer 112 is advantageously closed with a threaded plug 132.

In accordance with a feature of the invention, the radial ports 128 and 130 are arranged to take generally right triangular shape with the hypotenuse of the triangle lying in a plane which intersects the central axis of the valve plug at approximately a 45° angle. Co-action of such triangularly shaped ports with the circular orifices 88 has been found to incur a substantial degree of independence in regulation of both the aggregate flow and the proportioning achieved by the valve structure.

For purposes of affording a more complete understanding of the invention, it is advantageous now to provide a functional description of the mode in which the component parts cooperate. Therefore and assuming that the valve structure 20 has been installed with fitting 58 communicating with a cold water supply line and with fitting 60 communicating with a hot water supply line as previously mentioned, any desired mixture of hot and cold water from all cold water to all hot water is available by rotating the valve plug 92 using lever 116. Similarly, any rate of flow from zero flow to the maximum flow permitted by the valve structure is available by reciprocating valve plug 92, again using the lever 116. As will be recognized, reciprocal sliding action of the valve plug 92 is achieved upon crank 104 pivoting about pin 110 and rotating the pin 108 about its center. As the pin 108 rotates it oscillates in slot 106, retainer 112 and therefore pin 110 being fixed against axial movement by means of cap 124 and the circular flange adjacent the necked-down portion 118. The stop established through lugs 120 limits angular movement of valve plug 92 as described hereinabove.

This rotation of valve plug 92 is illustrated schematically in FIGS. 8 and 9. Considering FIG. 8 as being viewed from the forward end of bore 36, i.e. the end is closed by plug 132, the valve plug 92 will be seen rotated to the extreme of its counterclockwise movement so as to deliver only hot water to the chamber 126. Rotation of the valve plug 92 to the extreme of its clockwise movement is illustrated in FIG. 9 where the port 130 cooperates with the associated orifice 88 to deliver only cold water to the mixing chamber 126. Intermediate positioning of the valve plug 92 will allow flow to be directed to the mixing chamber 126 from both the hot and cold water supply lines, the relative volume of each fluid being determined by the amount of the area of the corresponding port which is exposed to the adjacent aperture orifice 88. In any event it is important to point out that, because of the co-action of the triangular ports 128 and 130 with the circular orifices 88, the total orifice area developed by registration of both ports 128 and 130 with the respective orifices 88 remains substantially constant. Thus, the total flow through the valve is unaffected by regulation of the proportioning of the mix for purposes of altering the temperature of the discharged fluid.

As mentioned hereinabove, aggregate flow through the valve structure 20 is achieved by reciprocating valve plug 92; and referring to FIG. 7, the forwardmost position of the valve plug is illustrated in which the ports 128 and 130 are thrust beyond registration with the orifices 88 whereby to shut off all flow through the valve structure. Sliding of the valve plug 92 in the direction of arrow 134 by proper manipulation of lever 116 gradually aligns the ports with the orifices 88; and depending upon the total opening size available from registering the ports 128 and 130 with the respective orifices 88, a given amount of flow will be achieved. As will be recognized, movement of valve plug 92 from the position shown in FIG. 7 in the direction indicated by arrow 134 will cause a gradual increase in the aggregate flow until the point of maximum orifice registration is achieved whereupon continued movement of the valve plug will result in a somewhat diminished flow as is shown by the position of the parts illustrated in FIG. 6. Again because of the cooperation of the triangular ports 128 and 130 with their respective circular orifices 88, the relative proportion of the different fluids flowing into the mixing chamber 126 remains substantially constant; and when the dissimilar fluids are dissimilar on the basis of temperature, a substantially constant temperature discharge is achieved during regulation of the aggregate flow.

The specific example herein shown and described should be considered as illustrative only. Various changes in structure may occur to those skilled in the art; and these changes are to be understood as forming a part of this invention insofar as they fall within the spirit and scope of the appended claims.

The invention is claimed as follows:

1. A valve structure for use in mixing two fluids in selected proportions, comprising: a valve body defining a central cavity, an outlet passageway communicating with said cavity, and inlet passageways opening radially from said cavity, each inlet passageway being connected to a fluid supply line; a valve plug slidably and rotatably disposed in said cavity and defining a hollow having a mouth disposable in fluid-discharging relationship with said outlet passageway, said valve plug further having radial ports opening into said hollow and flowwise registrable individually with an inlet passageway; a removable carrier unit in each of said inlet passageways, including a rigid thimble element having a central bore opening toward said valve plug and having ports cooperating to communicate said bore with a said supply line, said carrier unit further including a flexible element subject to becoming worn out in the use of the valve structure, said flexible element being at least partly received in the mouth of said bore to be extractable with said thimble element, said flexible element being perforated to define an orifice and coacting slidably with a radial port of said valve plug; and lever means connected to said valve body and to said valve plug for moving said plug to position the mouth of said hollow relative to said outlet passageway whereby to regulate aggregate flow through said valve body, and for rotating said valve plug to position the radial ports of said valve plug relative to the orifices of said flexible elements whereby to regulate the proportion of said aggregate flow entering said valve body from each of said supply lines.

2. A valve structure according to claim 1 wherein said thimble element has a portion of reduced cross-section which cooperates in defining a chamber open to a said supply line and wherein the central bore in said thimble element is a blind bore communicating with said chamber through the ports in said thimble element, whereby to balance said thimble element axially with respect to the fluid pressure from the cooperating supply line.

3. A valve structure according to claim 1 wherein said carrier unit further includes means providing a fluid seal at the external periphery of said thimble element downstream from the ports thereof and wherein said carrier unit additionally includes means providing a fluid seal between said flexible element and the surrounding walls of the central bore of said thimble element.

4. A valve structure according to claim 1 wherein said flexible element comprises a seat washer.

5. A valve structure according to claim 1 wherein said thimble element additionally includes a graspable enlargement away from that end of the central bore which receives said flexible element, said thimble element being of greater length than the cooperating inlet passageway whereby to expose said enlargement for ready extraction of said thimble element and wherein said valve structure further comprises a cup-shaped end cap closing each of said inlet passageways away from said cavity, each of said end caps acting to house the enlargement of the cooperating thimble element.

6. A valve structure according to claim 1 wherein the radial ports in said valve plug are right triangular in cross-section and wherein each of the orifices in said flexible elements are circular.

References Cited by the Examiner
UNITED STATES PATENTS

| 1,272,950 | 7/18 | Hawkins | 251—208 XR |
| 1,988,966 | 1/35 | Eckhouse | 137—454.6 |
| 2,141,428 | 12/38 | Carroll | 251—208 XR |
| 2,390,201 | 12/45 | Bredenbeck | 251—174 |
| 2,838,070 | 6/58 | Williams | 137—454.6 XR |
| 2,845,949 | 8/58 | Parker | 137—625.41 |
| 2,977,987 | 4/61 | Maynard | 251—317 XR |

FOREIGN PATENTS

| 566,357 | 8/57 | Italy. |

WILLIAM F. O'DEA, *Primary Examiner.*